J. SPARKS.
EDGER SET WORKS.
APPLICATION FILED FEB. 25, 1914.

1,150,551.

Patented Aug. 17, 1915.
6 SHEETS—SHEET 1.

Witnesses:
Albert J. Mutter
D. F. McGill

Inventor:
Joseph Sparks
By
J. L. Mock
Attorney

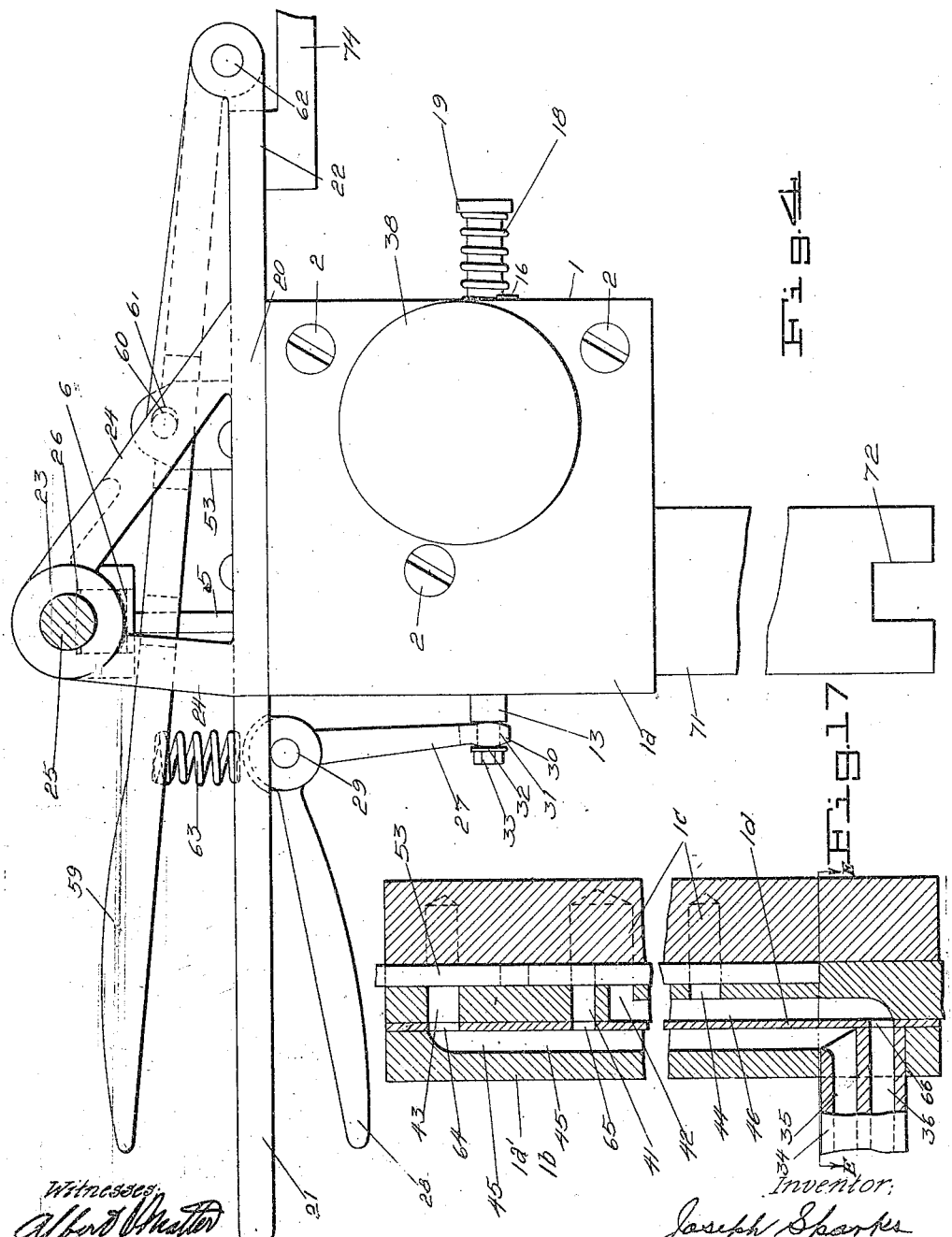

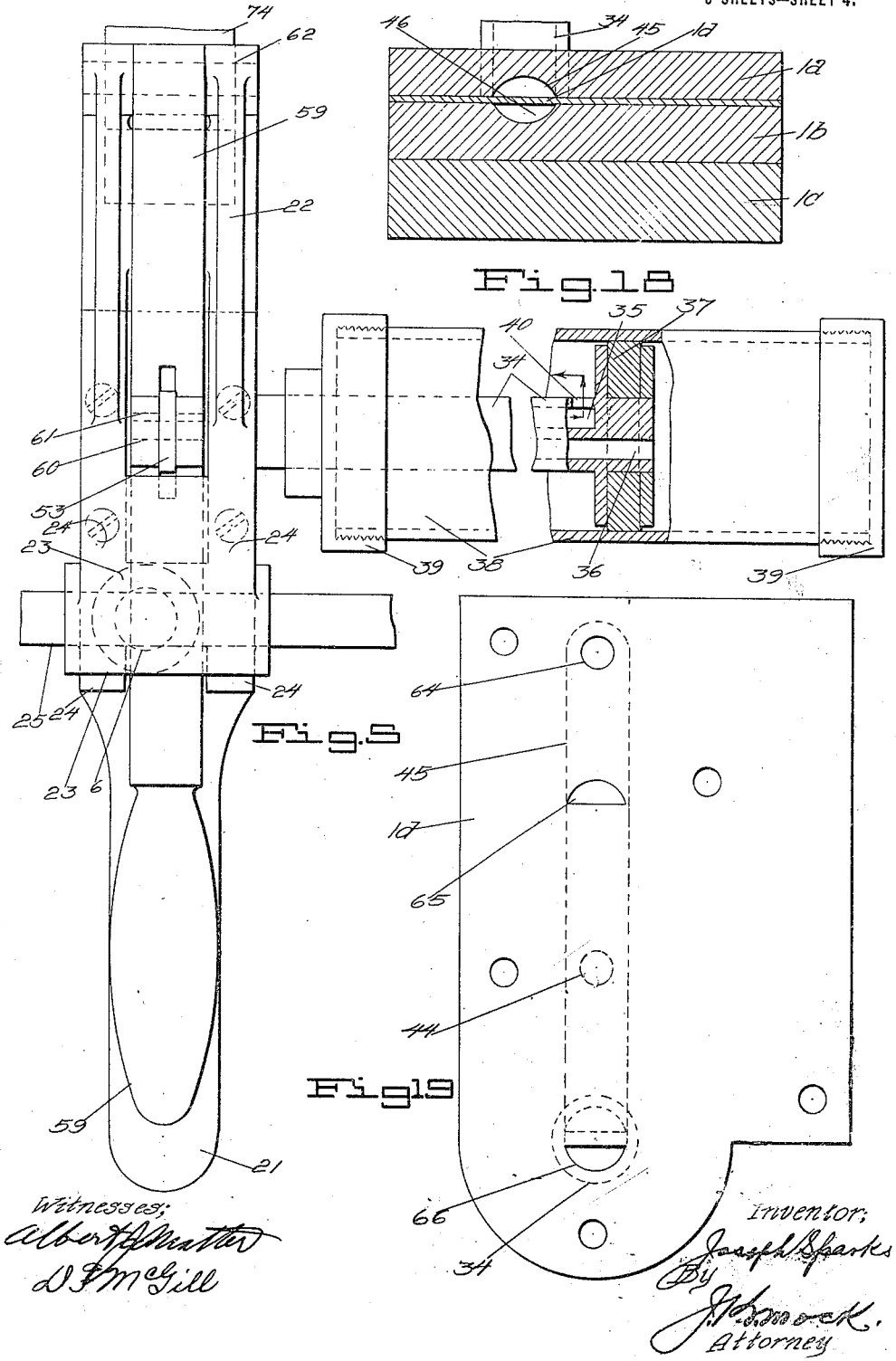

J. SPARKS.
EDGER SET WORKS.
APPLICATION FILED FEB. 25, 1914.
1,150,551.
Patented Aug. 17, 1915.
6 SHEETS—SHEET 5.
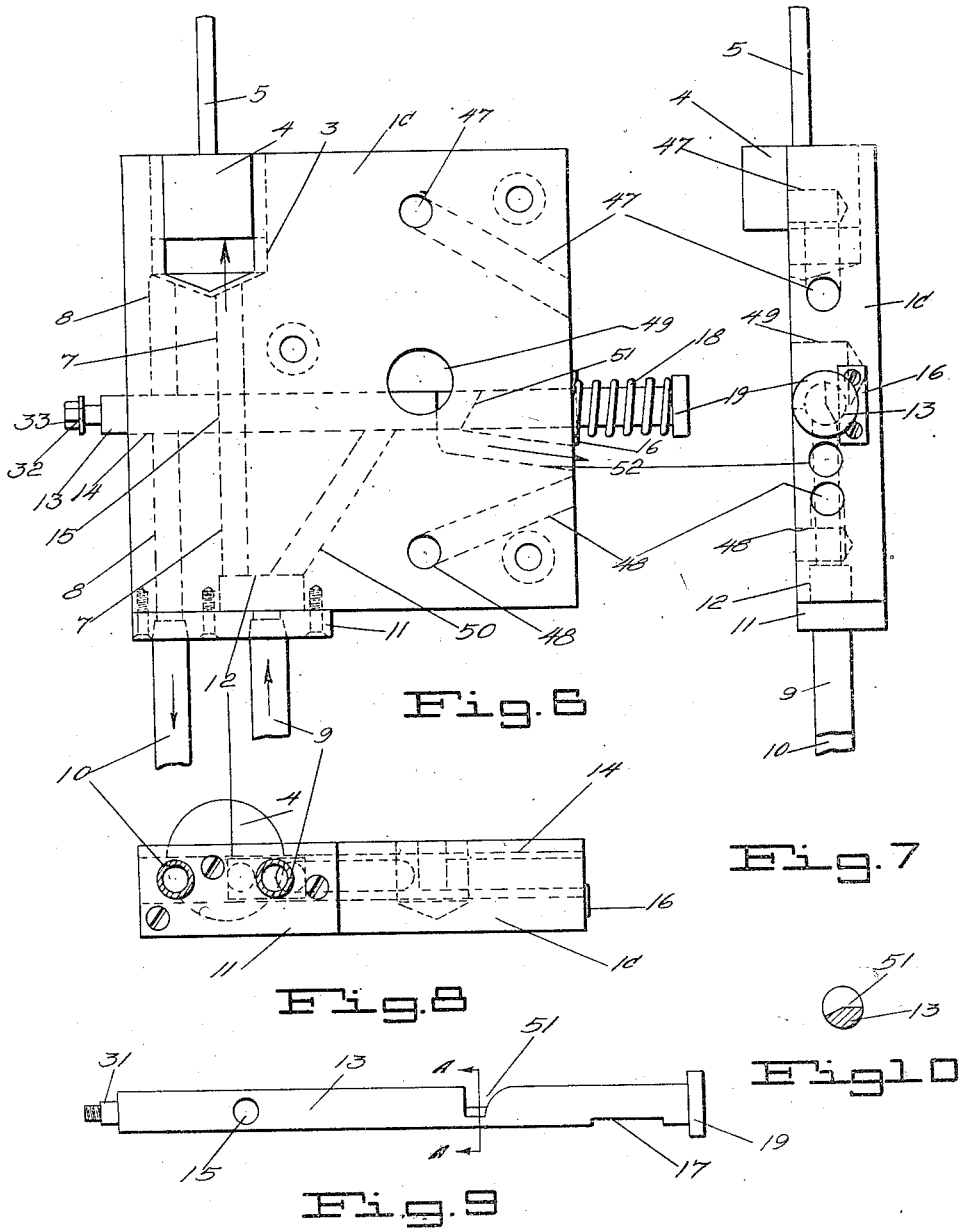

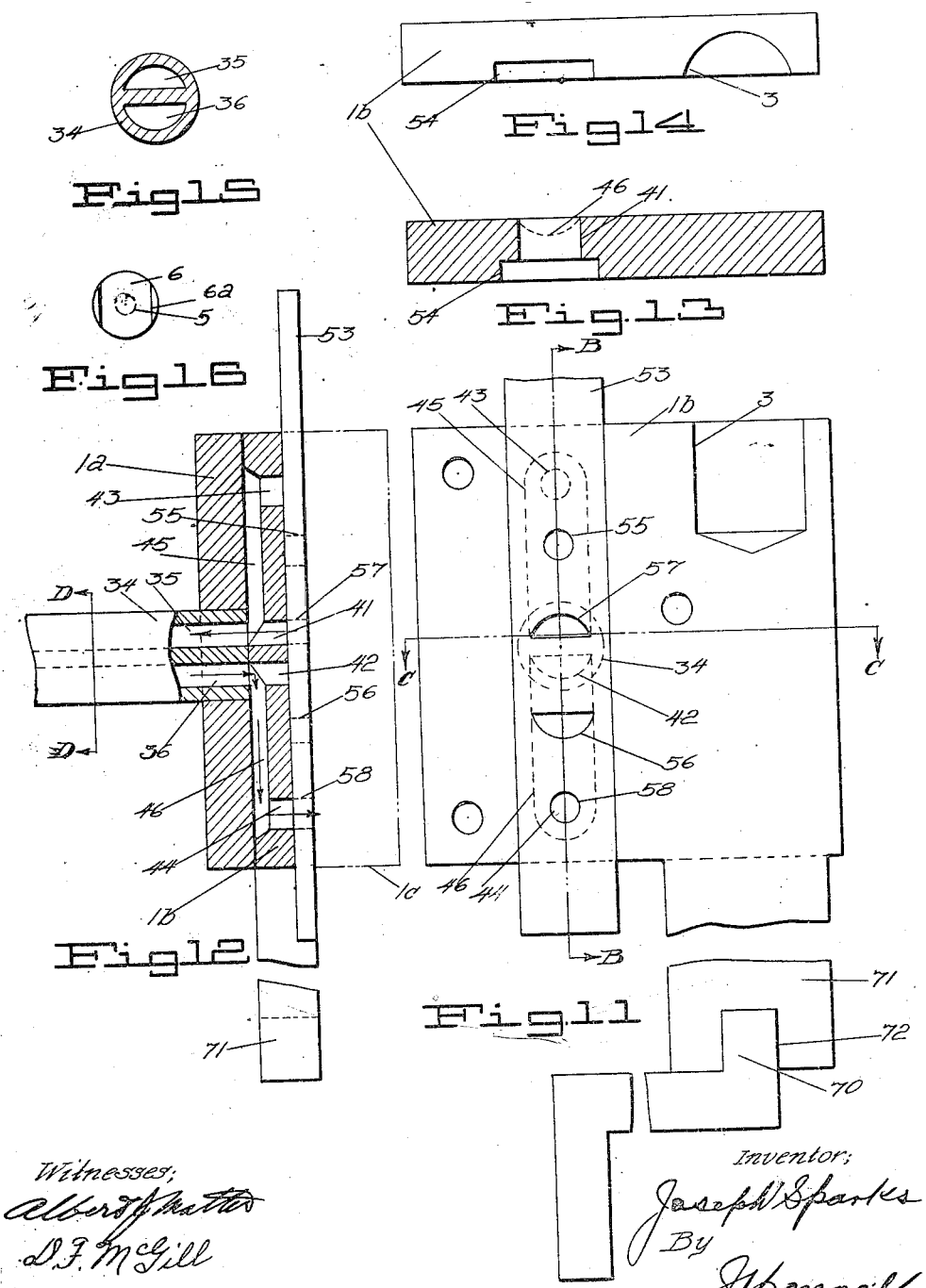

UNITED STATES PATENT OFFICE.

JOSEPH SPARKS, OF PORTLAND, OREGON.

EDGER SET-WORKS.

1,150,551.

Specification of Letters Patent.

Patented Aug. 17, 1915.

Application filed February 25, 1914. Serial No. 821,001.

*To all whom it may concern:*

Be it known that I, JOSEPH SPARKS, a citizen of the United States, residing at Portland, in the county of Multnomah and State of Oregon, have invented certain new and useful Improvements in Edger Set-Works, of which the following is a specification.

My invention relates to improvements in edger set-works, and has for its object to provide safe and accurate means for controlling the positioning of the edger saws.

In present saw-mill operations it is common practice to place the edgerman in front of the edger-feed-rolls where the saw control levers are located. This practice having resulted in innumerable accidents with their accompanying injuries to edgermen, because of their proximity to the feed rolls, I have invented a power set-works adapted to control the disposition of the edger-saws from a distance, thereby permitting the edgerman to be located in a safe position overlooking the edger. My device may also be located at the front of the edger if desired and has great advantage over the hand propelled setting lever both in accuracy of adjustment and ease of manipulation.

I attain the object of my invention by means of the construction illustrated in the accompanying drawings in which—

Figure 2:
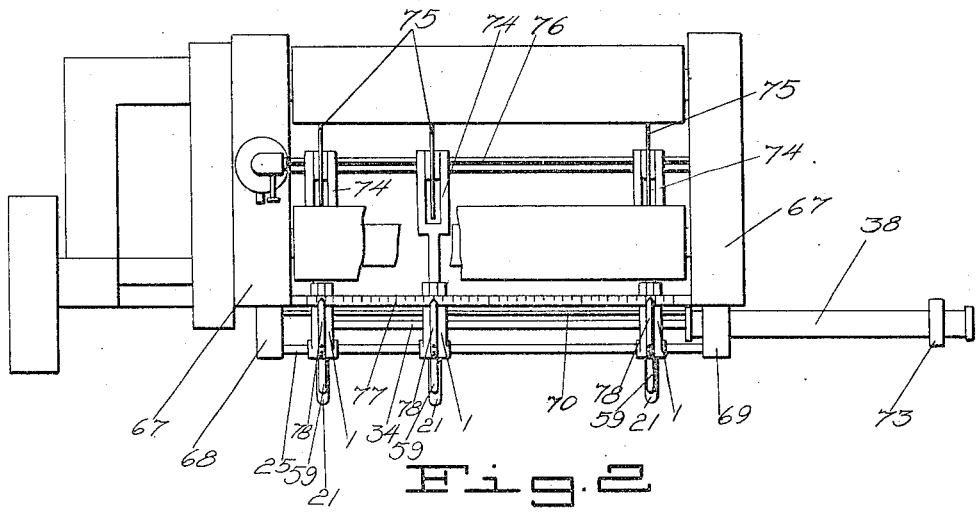
Figure 1:
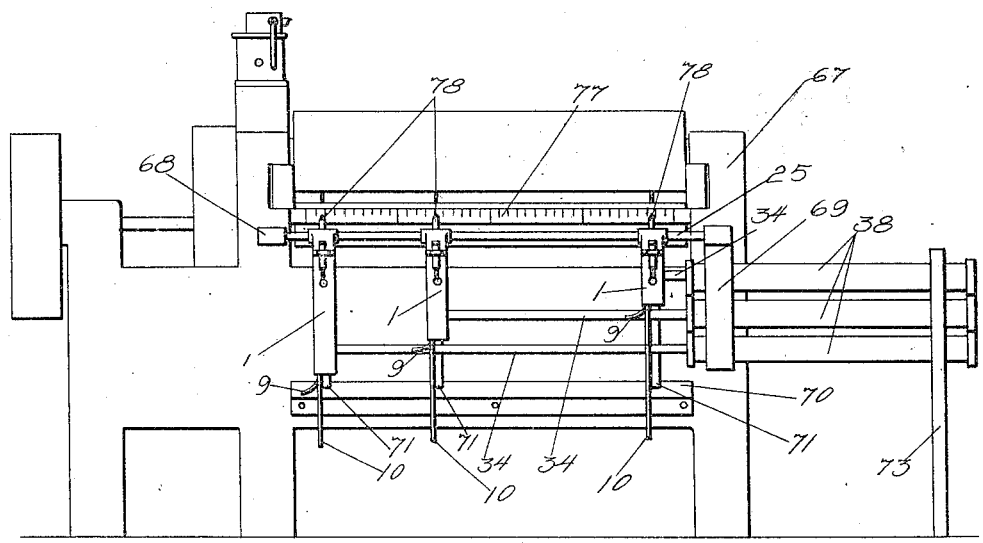
Figure 3:
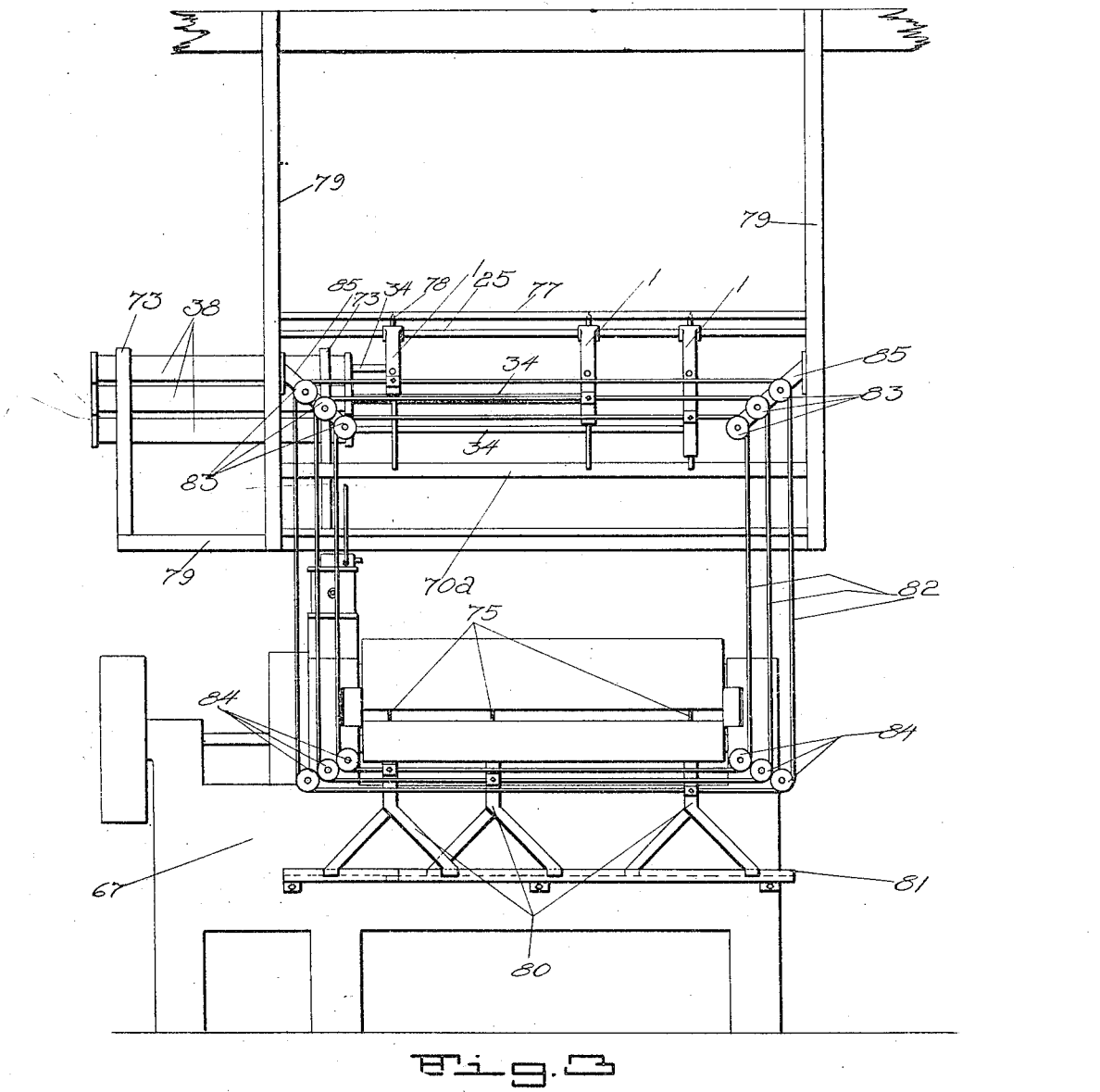

Figure 1 is a front elevation of a gang-edger equipped with my improved power-set-works located in proximity to the feed rolls. Fig. 2 is a plan view of the edger and set-works as shown in Fig. 1, with a portion of the feed rolls removed in order to show the method of controlling the disposition of the saws through the medium of the power-set-works. Fig. 3 is a front elevation of a gang-edger and an overhead-located power-set-works. Fig. 4 is a side elevation of the control-carriage of my power-set-works. Fig. 5 is a plan view of the control carriage with a portion of the operating cylinder and piston shown in sectional detail. Fig. 6 is a side elevation of one of the three blocks comprising the control carriage and depicts the method of controlling the air supply and exhaust. Fig. 7 is a rear elevation of the block shown in Fig. 6. Fig. 8 is a bottom view of the above mentioned block with the valve rod removed. Fig. 9 illustrates the valve rod in detail. Fig. 10 is a section through the valve rod taken on the line A—A of Fig. 9. Fig. 11 is a side elevation of the inner block of the control carriage, and illustrates the method of reversing the direction of the propelling piston within its cylinder. Fig. 12 is a sectional elevation of the block shown in Fig. 11, taken on the line B—B. Fig. 13 is a sectional plan view of the intermediary block, taken on the line C—C in Fig. 11. Fig. 14 shows a top-plan view of the intermediary block. Fig. 15 is a sectional transverse elevation of the piston rod, taken on the line D—D of Fig. 12. Fig. 16 is a top plan view of the gripping block shown dotted in Fig. 4. Fig. 17 is a sectional elevation of a modified form of control carriage blocks, illustrating the method of offsetting the reversing parts to permit the lowering of the piston rod and its cylinder when required to arrange them as shown in Fig. 1. Fig. 18 is a sectional plan view of the modified form of blocks shown in Fig. 17 taken on the line E—E. Fig. 19 is a side elevation of the dividing plate shown in Fig. 17.

Referring to the drawings, 1 designates a control carriage comprising 3 blocks, $1^a$, $1^b$ and $1^c$ held in juxtaposition by means of machine screws 2. Blocks $1^b$ and $1^c$ are provided with an intermediately disposed cylindrical opening 3 adapted to carry a vertically reciprocative gripper plunger 4 having a plunger rod 5 attached to its upper end carrying a gripping block 6. The function of this gripping block will be clearly delineated hereinafter. Reciprocatory motion of the plunger 4 may be secured by the admission or exhaustion of air into or out of the cylinder 3 which is connected with an intake port 7 and an exhaust port 8 provided in block $1^c$. An intake pipe 9 connected with an air supply source, and an exhaust pipe 10, are held by a plate 11 attached to block $1^c$ so that the exhaust pipe will register with the exhaust port and the intake pipe will register with an intake chamber 12 in block $1^c$ connecting with the intake port 7. To control the air supply in cylinder 3 a valve rod 13 is reciprocatively held within a horizontally disposed valve-rod bearing 14 in block $1^c$, its axis bisecting the axes of the intake and exhaust ports above described. Valve rod 13 is provided with an orifice 15 adapted to register in axial juxtaposition with the intake or exhaust ports, depending upon the position of the valve rod 13 within its bearing 14. Reciprocatory movement of the valve rod 13 is limited by means of a stop plate 16 attached to block 1ᶜ so as to engage a recess 17 provided in the under side of valve rod 13. It is desirable, as will be hereinafter shown, that the valve-rod-orifice 15 be held normally in register with the intake port 7; therefore, a helical compression spring 18 is provided and surrounds the rearwardly projecting end of the valve rod 13, its outer end engaging an enlarged head 19 on valve rod 13 and its opposite end abutting the block 1ᶜ, thereby holding the valve rod 13 normally at its rearward limit of travel, which is so arranged as to hold the valve-rod-orifice 15 in its proper co-axial relation with the intake port 7. Forward movement of valve-rod 13, tending to compress the spring 18, is limited so as to permit the orifice 15 to register with exhaust port 8. A bracket 20 having a handle 21 and rear extension 22 is rigidly attached to the upper ends of the blocks 1ᵃ, 1ᵇ and 1ᶜ and is provided with a bearing 23 mounted on legs 24. The bearing 23 is adapted to engage a cross rod 25 upon which the control carriage is arranged to slide. The aforementioned gripping block 6 is held within a bearing 26 provided below the bearing 23 so as to permit the concave grip surface 6ᵃ of the gripping block 6 to engage the cross rod 25 when sufficient air is applied beneath the gripping plunger 4, thereby holding the control carriage in a fixed position when desired. Actuation of the valve-rod 13 is secured through a lever 27 forked at 30 and having a handle 28, and pivotally mounted at 29 upon the lower side of the handle 21. The forked ends 30 of lever 27 are adapted to engage a reduced neck 31 of the valve rod 13 upon which is mounted a retaining washer 32 held in place by a nut 33. It is obvious now that upward actuation of the handle 28 will release the gripping block 6 and permit the control carriage 1 to travel along the length of the cross rod 25 when so propelled.

The aforementioned block 1ᵃ of the carriage 1 has attached to it a hollow piston rod 34 divided transversely into two air ducts 35 and 36 and carrying a piston 37 mounted within a cylinder 38, having cylinder heads 39. The air duct 35 is stopped off near the piston end and its course diverted transversely at 40 before reaching the piston 37. The air duct 36, however, is permitted to continue through the piston 37 thereby allowing air to be introduced into the cylinder 38 either before or behind the piston 37 as will be further described. Block 1ᵇ is provided with intake ports 41 and 42 registering respectively with air ducts 35 and 36. Exhaust ports 43 and 44 are also provided in block 1ᵇ and are respectively connected by means of passages 45 and 46 with the intake ports 41 and 42. Block 1ᶜ is provided with exhaust ports 47 and 48 registering respectively with the exhaust ports 43 and 44 in blocks 1ᵇ and is also provided with an intake port 49 registering with the intake ports 41 and 42 in block 1ᵇ. An intake passage 50 is diagonally disposed in block 1ᶜ so as to connect at one end with the intake chamber 12 and at the other end with the valve-rod-bearing 14 at a point near the intake port 49. To admit air from the passage 50 to the intake port 49 the valve rod 13 is provided with a groove 51 which is so disposed as to register with the intake passage 50 and the intake port 49 when held in forward position but is out of register with the intake passage 50 when in normal position. In order to relieve any back pressure in the intake port 49 when the valve rod is in normal position, a relief port 52 is provided in block 1ᶜ, registering with the groove 51 when the valve rod is in its normal position. For controlling the direction of the air supply in cylinder 38 a reversing valve-bar 53 is reciprocatively mounted in a groove 54 in block 1ᵇ adjacent to block 1ᶜ so as to separate respectively the ports 41, 42, 43 and 44 in block 1ᵇ, and 49, 49, 47 and 48 in block 1ᶜ. Valve-bar 53 is provided with orifices 55, 56, 57 and 58 connecting the ports 43 with 47 and 42 with 49, or 41 with 49 and 44 with 48 so as to admit air through duct 36 into cylinder 38 behind the piston 37 while exhausting air from in front of the piston 37 through duct 35 or so as to admit air through duct 35 into cylinder 38 in front of the piston 37, while exhausting air from behind the piston 37 through duct 36.

The valve bar 53 is pivotally attached at its upper end to a lever 59 by means of a pin 60 held in a longitudinal slot 61. Lever 59 is pivotally attached at its rearward end to the bracket extension 22 at 62 and is normally held up by a helical compression spring 63 disposed resiliently between the lever 59 and the handle 21.

Although the carriage has been described as comprising three blocks each provided with certain ports, I do not wish to be limited to this construction as it is clearly evident that the same results may be obtained by making the three blocks integral, although this would make it more difficult to properly machine and finish the various ports and valve-seats. Various other alterations in the construction of my device may also be made without materially affecting the spirit of my invention. When more than one control carriage is used on an edger it becomes necessary to lower some of the pistons, thereby bringing their air ducts out of alinement with their intake ports and consequently requiring a different construction as illustrated in Figs. 17, 18 and 19 in which a dividing plate 1ᵈ is interposed between blocks 1ᵃ and 1ᵇ and is provided with orifices 64, 65 and 66 registering respectively with ports 43 and 41 and duct 36 and separating the passages 45 and 46.

In Figs. 1 and 2 I show a gang edger 67 equipped with my device, the cross rod 25 being held horizontally in brackets 68 and 69 attached to the edger. At 70 is shown an auxiliary support or guide rail adapted to carry the supporting arms 71 attached to the carriage 1 and having a guide-rail-engaging grooves 72. The cylinders 38 are held in the bracket 69 and support 73. The bracket extensions 22 of the control carriages are provided with forked arms 74 adapted to engage and regulate the location of the saws 75 on their feathered shaft 76. In order to facilitate the proper spacing of the saws for various widths of lumber, an indexed cross-bar 77 is attached to the edger parallel to the cross rod 25, points 78 being attached to the control carriage and registering with the indices on the cross bar 77.

In Fig. 3 is shown a gang edger 67 equipped with an over-head controlled power set-works in which the cylinder supports 73, cross rod 25, index bar 77, guide rail 70ª and control carriages 1 are mounted on an overhead frame 79.

The saws 75 are shown regulated by the old style hand propelled set works 80 traveling on their guide rail 81 but with the hand levers removed. The setting carriages 80 are operated by the control carriages 1 through the medium of connecting cables 82 which pass over sheaves 83 and 84, the sheaves 83 being revolubly mounted on brackets 85 attached to the overhead frame 79 and the sheaves 84 being revolubly mounted on the edger frame 67.

It is understood that the control carriage may be located at any desired point near the edger and connected therewith by means of cables as shown, or by any other suitable connecting means.

If desired, my set-works may be used to control the location of saws in machines other than edgers.

What I claim, is—

1. A mechanism for moving saws to different operative positions comprising in combination with a saw movably mounted, a cylinder, a piston working therein and operatively connected with said saw, a source of operating fluid with connections for operating said piston in said cylinder, a controlling mechanism for controlling the supply of fluid to said cylinder, and a locking mechanism with piston and cylinder for operating the same to lock said saw in different operating positions, said controlling mechanism being adapted to turn the supply of operating fluid from said saw moving cylinder to the cylinder of said locking mechanism, for the purpose referred to.

2. In an edger or the like, in combination, an arbor, a saw movably mounted thereon and movable longitudinally thereof, a power shifting mechanism for moving said saw on said arbor comprising a cylinder, a piston working in said cylinder and operatively connected with said saw for positively moving it in opposite directions on said arbor, a source of operating fluid with connections for operating the piston in said cylinder, a controlling mechanism for controlling the supply of fluid to said cylinder at either side of said piston, whereby said saw is positively moved on said arbor to different operating positions, and means controlled by said controlling mechanism for automatically locking said saw in the stopped position.

3. In an edger or the like, in combination, an arbor, a saw movably mounted thereon and movable longitudinally thereof, a power shifting mechanism for moving said saw on said arbor comprising a cylinder, a piston working therein and operatively connected with said saw, a source of operating fluid with connections for operating the piston in said cylinder, a controlling mechanism for controlling the supply of fluid to said cylinder at either side of said piston, said controlling mechanism having a part controlling the passageways to said cylinder and a part controlling the supply of operating fluid to said passageways, and means holding the part which controls the passageways in a position to admit the operating fluid to that side of the piston for moving the saw away from the work, whereby in order to move the saw toward the work, said passageway-controlling-part must be manually operated, substantially as described.

4. In an edger or the like, in combination, an arbor, a saw slidably mounted thereon, a power shifting mechanism for moving said saw on said arbor comprising a cylinder, a piston operatively connected with said saw, a source of operating fluid with connections into said cylinder, a locking mechanism for locking said saw in different positions of adjustment longitudinally of said arbor, a cylinder and piston for operating the same, with supply connections to said source of operating fluid, and a controlling mechanism for controlling the passageways to said cylinders and the admission of the operating fluid thereto, said controlling mechanism having a part normally held in position to open a passageway to said saw-operating cylinder to move the saw away from the work and manually operable to reverse the movement of the saw, and a part for turning the supply of operating fluid from the saw-moving cylinder to the cylinder for locking the saw in stopped position, substantially as described.

5. In an edger, in combination, an arbor, a saw slidably mounted thereon and movable longtudinally thereof, a power shifting mechanism for positively moving said saw in opposite directions on said arbor, said mechanism comprising a cylinder, a piston working therein and operatively connected with said saw, a source of operating fluid for moving said piston with supply connections to said cylinder, and a controlling mechanism movably mounted and moving with said saw and having a part controlling the passageways to the opposite sides of the piston in said cylinder with means normally holding it in one position, and a part controlling the admission of operating fluid to said passageways, both of said parts being manually operable, and a locking mechanism for locking said saw in stopped positions with operating connections to said controlling mechanism adapted to be operated automatically through the part which controls the admission of the operating fluid to the saw operating cylinder.

6. In an edger or the like, a supporting frame, an arbor mounted therein, a saw slidably mounted on said arbor and movable longitudinally thereof, a power shifting mechanism for positively moving said saw in opposite directions on said arbor comprising a cylinder mounted in said frame, a piston working in said cylinder, a source of operating fluid with supply connections to the opposite sides of the piston in said cylinder, operating connections from said piston to said saw for moving the same, a controlling mechanism, said controlling mechanism having a part controlling the passageways to said cylinder and a part controlling the supply of operating fluid through said passageways, whereby the movement of one part opens the passageway to the cylinder at one side or the other of the piston, and the movement of the other part admits the operating fluid to said passageway.

7. In a device of the character described, in combination with a saw movably mounted, a piston and cylinder with operative connections for moving said saw in opposite directions, a locking mechanism with piston and cylinder connected to operate the same, a source of operating fluid with supply connections to both of said cylinders, and a controlling mechanism interposed with a part controlling the passageways to said cylinders and a part controlling the admission of said operating fluid thereto, said controlling mechanism being operable to turn the supply of operating fluid from one cylinder to the other.

8. In an edger or the like, in combination, a supporting frame, an arbor mounted therein, a saw slidably mounted on said arbor and movable longitudinally thereof, a cylinder with piston working therein, a source of operating fluid for said cylinder with supply connections thereto, a controlling mechanism for controlling the supply of operating fluid to said cylinder, operating connections from the piston of said cylinder to said saw and to said controlling mechanism whereby both are moved with said piston, means for holding said saw in stopped position, said controlling mechanism having a part adapted to control the passageways and being normally held in one position whereby to admit said operating fluid to said cylinder to move the saw away from the work, and another part adapted to open the supply of operating fluid to said passageways, said parts being manually operable at will and adapted to set said holding means in operation to hold the saw in stopped position when moved to cut off the supply of operating fluid to said saw-moving cylinder, substantially as described.

In testimony whereof I affix my signature in the presence of two witnesses.

JOSEPH SPARKS.

Witnesses:
G. BLAINE NISSEN,
H. A. ARMSTRONG.